Patented Feb. 11, 1941

2,231,317

UNITED STATES PATENT OFFICE 2,231,317

METHOD OF WELDING

George S. Bernard, Jr., New Kensington, Pa., assignor to Aluminum Company of America, Pittsburgh, Pa., a corporation of Pennsylvania No Drawing. Application April 14, 1939,
Serial No. 267,914

8 Claims. (Cl. 219—10)

This invention relates to an improved method of making a flash-butt weld between pieces of metal, and more particularly it relates to the joining of abutting pieces of aluminum or aluminum alloys by a resistance flash welding operation.

The term "aluminum," as used in this specification and in the appended claims, is intended to include pure aluminum, aluminum containing the usual impurities, and aluminum base alloys.

Flash-butt welding or flash welding is usually accomplished by arranging the two pieces to be welded end to end, connecting them to a suitable source of electricity, establishing and maintaining an arc between them which melts the metal in a localized area at the ends of the pieces, then pushing the pieces together to extinguish the arc and upset the metal to produce the welded joint, and subsequently cutting off the current. Flash welding machines used for this purpose generally comprise a fixed die and a movable die, both adapted to clamp the work pieces, mechanism adapted to drive the movable die to bring the work pieces together, a suitable source of electricity connected to said dies, such as the secondary of a transformer, and an automatic switch actuated by movement of the die for cutting off the current.

Heretofore difficulties have been experienced in producing satisfactory flash welds between pieces of aluminum of compact and relatively large, cross-sectional areas. By a compact cross-section is meant a cross-section having its various dimensions of substantially the same order, such as a circle or square, as distinguished, for example, from the cross-section of a thin sheet. By way of illustration, it has been found very difficult, if not impossible, to produce satisfactory welds between pieces of relatively large diameter, round aluminum rod, i. e. rod about ⅝ inch in diameter or greater, by methods of flash welding known in the art. The reason advanced why pieces of compact and relatively large, cross-sectional area cannot be satisfactorily welded by the conventional methods is that, upon attempting to bring the pieces into contact with one another during arcing, excessive spattering and burning away of the metal occurs so that it is usually impossible to do so rapidly enough to obtain sufficient metal to metal contact to extinguish the arc, with the result that no weld is made or, at the most, a weld of inferior strength and structure is made.

It is an object of this invention to provide an improved method of flash welding. A further object is to provide an improved flash welding procedure by means of which satisfactorily welded joints may be formed in pieces of aluminum. A further object of the invention is to provide a rapid and convenient method of flash welding pieces of aluminum of compact and relatively large, cross-sectional area.

A further object of the invention is to provide a flash welding method in which the duration of the arc, the time at which the pieces are brought together to form the weld, and the degrees of hot working and cold working of the metal in the weld zone may readily be controlled. Another object of the invention is to provide a flash welding method capable of producing satisfactory joints in aluminum of compact and relatively large, cross-sectional area, which may be practiced upon the conventional flash welding machines and necessitating only slight modification thereof. Other objects and advantages of the invention will become apparent in the following description.

In the practice of my invention, the work pieces to be welded are clamped in the dies of any suitable flash welding machine, such, for example, as the one described above, with the ends of the pieces almost touching or just partially touching one another; they are thus placed in the welding circuit, the said dies being adapted to carry the welding current to the work pieces. The machine is then pre-adjusted to move one of the parts toward the other at a predetermined and preferably accelerated speed. The current is then turned on and the die-driving mechanism started. Upon a slight initial contact being made between the substantially contiguous work pieces, an arc is created between the adjacent ends thereof, the action of which is to heat the said ends to the welding temperature, to exclude the atmosphere from the welding zone, and to vaporize and burn away some of the metal and impurities. As the ends of the work pieces burn away, the arc is maintained by the continuous relative movement of the pieces. After the arcing has proceeded for a sufficient period to bring the metal into proper welding condition, the arc is extinguished by momentarily cutting off the current; the parts then come into contact with one another, there being no consumption of metal while the current is off. The power circuit is then immediately closed again and current flow re-established in the merged parts. Since the metal to metal joint offers lowered resistance, this current is generally on the order of from 2 to 5 times that which previously flowed through the arc with no applied voltage change, and it results in a general heating of the metal while the latter is being upset by the continuous relative movement of the work pieces by the machine. The period during which no current flows is preferably only long enough for the parts to make sufficient contact with one another to prevent re-establishment of an arc. This period is relatively short, being generally from about 0.008 second to about 0.05 second.

Subsequent to the making of contact or merging of the parts, the continued movement of the one part toward the other by the machine and the relatively large current flowing through the connected parts results in hot working of the metal at the welding zone. The degree of hot working may be accurately controlled according to the invention by regulating the period during which the re-established current flows. The current is then finally cut off after the desired amount of hot working has been accomplished, and the weld is allowed to cool. During the cooling period the motion of the pieces toward one another is preferably continued, which results in cold working of the metal. This cold working operation lends additional strength and improvement in other mechanical properties of the welded joint. When the metal has been cold worked in this manner to the desired degree, the motion of the parts is stopped and the work may be removed from the welding machine.

Satisfactory welds have been produced between work pieces of relatively compact and large, cross-sectional areas by my invention, which welds could not be satisfactorily produced by previously known methods of flash welding. By momentarily stopping the current flow at a predetermined time during the arcing process and by merging the parts while the current is off, a proper arcing period may be obtained; and the work pieces may be brought together without the detrimental effects believed caused by excessive arcing during the contact making period, with the result that welded joints of improved structure and increased strength, and of types heretofore impossible to make in normal practice, may be obtained by my method. By only momentarily interrupting the current flow and by establishing a relatively large flow of current immediately after the work pieces have come into contact, undue cooling of the metal pieces is prevented and the metal may be held at a desirable hot working temperature.

Since the amount of heating in my method is regulated by varying the time intervals of current flow, no additional electrical equipment, such as choke coils or other additional equipment for varying the voltage, etc., is needed. Generally, the only change in the conventional flash welding machines necessary for the practice of my invention is the setting of an automatic current interrupter switch, with which these machines may be equipped, to de-energize and re-energize the transformer at the proper predetermined times during the travel of the movable die.

It will be appreciated that factors such as the speed at which the pieces are brought together, the magnitude of the current, the length of the arcing period, and the duration of the hot and cold working periods vary with the different types of material being welded and with the properties desired in the welds. The variations in these factors will of course require slight modification of the preferred method disclosed. The novel features of the invention will be found particularly set forth in the appended claims.

What is claimed as the invention and desired to be secured by Letters Patent is:

1. In a method of electric resistance flush-butt-welding, the following steps, establishing and maintaining an electric current arc between the abutting ends of the parts to be joined, momentarily interrupting the current flow between the parts for the period during which they are brought together, and immediately thereafter re-establishing current flow in the parts for at least a portion of the period during which they are upset.

2. In a method of butt welding metal parts, wherein the said parts are heated at their adjacent ends by an electric arc and pressed together to upset the metal at the welding zone, the steps comprising extinguishing the arc before the parts make welding contact, then immediately bringing the parts together and then immediately upsetting the metal in the welding zone while maintaining a desired hot working temperature during the upsetting operation by immediately re-establishing current flow through the parts upon welding contact therebetween.

3. In a method of butt welding metal parts of compact and relatively large, cross-sectional areas, wherein the said parts are heated at their adjacent ends by an electric arc and pressed together to upset the metal at the welding zone, the steps comprising establishing an arc between the parts, extinguishing the arc after the metal has reached the desired welding condition and before the parts make welding contact, then immediately bringing the parts together, then immediately beginning the upsetting operation, and at the same time immediately re-establishing current flow through the merged parts to permit hot working of the metal at the welding zone.

4. In a method of butt welding metal parts of compact and relatively large, cross-sectional areas, wherein the said parts are heated at their adjacent ends by an electric arc and then pressed together to upset the metal at the welding zone, the steps comprising establishing and maintaining an arc between the parts, extinguishing the arc after the metal has reached the desired temperature and before the parts make contact, then immediately bringing the parts together, then during the immediately following upsetting operation immediately re-establishing a flow of current through the parts at substantially the same voltage as was employed to maintain the arc, and maintaining the same for at least a time sufficient to maintain the metal at the desired hot working temperature.

5. In a method of butt welding aluminum parts of compact and relatively large, cross-sectional areas, the steps comprising heating the adjacent ends of the parts by an arc produced by an electric current flowing therethrough, momentarily interrupting the current to extinguish the arc, at the same time causing the parts to make contact, and immediately thereafter re-establishing the flow of current through the merged parts while upsetting the same.

6. A method of flash welding aluminum parts of compact and relatively large, cross-sectional areas which comprises arranging said parts end to end, establishing an arc between said ends by passing a current therethrough, moving said parts together with an accelerated motion, momentarily interrupting the current flow at the time the parts make contact with one another, immediately re-establishing the current flow through the initially merged parts, and continuing the current flow and motion of the parts to impart to the metal at the welding zone a predetermined amount of hot working.

7. A method of flash welding aluminum parts of compact and relatively large, cross-sectional areas which comprises arranging said parts end to end, creating an arc between said ends by passing a current therethrough, moving said parts together with an accelerated motion, interrupting the current flow for a period of from about 0.008 second to about 0.05 second, initially merging the parts with one another during said period, whereby an increased current immediately flows through the connected parts at the end of said period, and continuing the flow of current and the motion of the parts until the metal at the welding zone has been hot worked to a predetermined extent.

8. The method of electric resistance flash-butt welding which includes the step of momentarily interrupting current flow between the parts being welded for a period during which flashing is thus terminated and the parts initially merged, current otherwise continuously flowing through the parts during prior flashing and subsequent upsetting periods.

GEORGE S. BERNARD, Jr.

CERTIFICATE OF CORRECTION.

Patent No. 2,231,317. February 11, 1941.

GEORGE S. BERNARD, JR.

It is hereby certified that error appears in the printed specification of the above numbered patent requiring correction as follows: Page 2, second column, line 3, claim 1, for "flush-" read --flash- --; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.